(12) United States Patent
Xiong et al.

(10) Patent No.: US 9,481,586 B2
(45) Date of Patent: Nov. 1, 2016

(54) DESALINATION SYSTEM AND METHOD

(75) Inventors: Rihua Xiong, Shanghai (CN); Linglu Yang, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 279 days.

(21) Appl. No.: 14/342,936

(22) PCT Filed: Aug. 13, 2012

(86) PCT No.: PCT/US2012/050508
§ 371 (c)(1),
(2), (4) Date: Mar. 5, 2014

(87) PCT Pub. No.: WO2013/036353
PCT Pub. Date: Mar. 14, 2013

(65) Prior Publication Data
US 2014/0209462 A1 Jul. 31, 2014

(30) Foreign Application Priority Data

Sep. 8, 2011 (CN) .......................... 2011 1 0265274

(51) Int. Cl.
*B01D 61/44* (2006.01)
*C02F 1/469* (2006.01)
(Continued)

(52) U.S. Cl.
CPC ............. *C02F 1/4695* (2013.01); *B01D 61/44* (2013.01); *B01D 61/58* (2013.01); *C02F 1/4693* (2013.01);
(Continued)

(58) Field of Classification Search
CPC .. C02F 1/4695; C02F 1/4602; C02F 1/4693; C02F 2303/22; B01D 61/44; B01D 61/58; B01D 61/48
See application file for complete search history.

(56) References Cited

U.S. PATENT DOCUMENTS 3,893,901 A * 7/1975 Tejeda .................... B01D 61/48
204/632
5,645,703 A * 7/1997 Tsai ...................... B01D 61/445
204/537

(Continued)

FOREIGN PATENT DOCUMENTS

CN 101306855 A 11/2008
JP 08108184 A 4/1996

(Continued)

OTHER PUBLICATIONS

Unofficial English translation of Office Action issued in connection with corresponding TW Application No. 101131929 on Jan. 29, 2016.

(Continued)

*Primary Examiner* — Arun S Phasge
(74) *Attorney, Agent, or Firm* — GE Global Patent Operation

(57) ABSTRACT

A desalination system is provided. The desalination system comprises a desalination apparatus. The desalination apparatus comprises first and second electrodes, and a first group of paired ion exchange membranes disposed between the first and second electrodes to form a first group of alternating first and second channels. The first channels are configured to receive a first stream for desalination and the second channels are configured to receive a second stream to carry away ions removed from the first stream, respectively. The desalination apparatus further comprises a plurality of spacers disposed between each pair of the adjacent ion exchange membranes and between the first and second electrodes and the respective ion exchange membranes. Wherein each of the ion exchange membranes in the first group is a cation exchange membrane. A desalination system and a method for removing ions from an aqueous stream area also presented.

19 Claims, 4 Drawing Sheets

(51) Int. Cl.
*C02F 9/00* (2006.01)
*B01D 61/58* (2006.01)
*C02F 1/46* (2006.01)
*B01D 61/48* (2006.01)

(52) U.S. Cl.
CPC ............... *C02F 9/00* (2013.01); *B01D 61/48* (2013.01); *B01D 2311/04* (2013.01); *B01D 2311/12* (2013.01); *C02F 1/4602* (2013.01); *C02F 2201/4611* (2013.01); *C02F 2201/46115* (2013.01); *C02F 2301/08* (2013.01); *C02F 2303/22* (2013.01)

(56) References Cited

U.S. PATENT DOCUMENTS

| | | | |
|---|---|---|---|
| 6,149,788 | A | 11/2000 | Tessier et al. |
| 6,274,019 | B1 | 8/2001 | Kuwata |
| 6,402,917 | B1 * | 6/2002 | Emery ............... C02F 1/4695 204/524 |
| 6,565,725 | B2 | 5/2003 | Sugaya et al. |
| 7,338,600 | B2 | 3/2008 | Chidambaran et al. |
| 2006/0231403 | A1 | 10/2006 | Riviello |
| 2011/0005749 | A1 | 1/2011 | Curole et al. |

FOREIGN PATENT DOCUMENTS

| | | |
|---|---|---|
| JP | 2001097714 | 4/2001 |
| JP | 2007301477 A | 11/2007 |
| JP | 2011088085 A | 5/2011 |
| WO | 2006110860 | 10/2006 |

OTHER PUBLICATIONS

Fu et al., "Removal of Low Concentrations of Hardness Ions from Aqueous Solutions using Electrodeionization Process", Separation and Purification Technology, vol. 68, Issue 3, pp. 390-396, Aug. 25, 2009.

International Search Report and Written Opinion dated Dec. 6, 2012 which was issued in connection with PCT Application No. PCT/US12/50508 which was filed on Aug. 13, 2012.

Unofficial English Translation of Japanese Office Action issued in connection with corresponding JP Application No. 2014529728 on Jul. 5, 2016.

* cited by examiner

DESALINATION SYSTEM AND METHOD

BACKGROUND OF THE DISCLOSURE

The invention relates generally to desalination systems and methods for pure water production. More particularly, this invention relates to desalination systems and methods using ion exchange membranes for removal of hardness ions for high purity water production.

Water with high purity are widely used in in many industrial processes, such as in high-pressure boilers in power plants, production of semiconductor elements, production of printed circuit boards, production of integrated circuit, and production of injection water for medical purpose.

Typically, due to continuous operation, and stable and relatively higher quality of product water, electrodeionization (EDI) apparatuses have been employed for processing such liquid steams, for example for production of pure water. Generally, the EDI apparatuses use conventional electrodialysis systems with ion exchange resin filled therein to process the liquid streams. However, during operation, because polyvalent cations with higher concentration may cause scaling tendency, the EDI apparatuses have a hardness tolerance for the liquid streams to be processed. For example, the hardness tolerance of the EDI apparatuses is about less than 1 ppm, which may need rigorous pretreatment of the liquid streams to decrease the hardness therein before the liquid streams are introduced into the EDI apparatus.

There have been attempts to pretreat the liquid streams to decrease the hardness therein. For example, reversal osmosis (RO) apparatuses are employed. However, the processing efficiency of the reversal osmosis apparatuses may be relatively lower for decreasing the hardness in the liquid streams to a certain level suitable for the EDI apparatuses. As a result, the processing cost may be increased accordingly.

Therefore, there is a need for new and improved desalination system and method for removal of hardness ions for high purity water production.

BRIEF DESCRIPTION OF THE DISCLOSURE

A desalination system is provided in accordance with one embodiment of the invention. The desalination system comprises a desalination apparatus. The desalination apparatus comprises first and second electrodes, and a first group of paired ion exchange membranes disposed between the first and second electrodes to form a first group of alternating first and second channels. The first channels are configured to receive a first stream for desalination and the second channels are configured to receive a second stream to carry away ions removed from the first stream, respectively. The desalination apparatus further comprises a plurality of spacers disposed between each pair of the adjacent ion exchange membranes and between the first and second electrodes and the respective ion exchange membranes. Wherein each of the ion exchange membranes in the first group is a cation exchange membrane.

A desalination system is provided in accordance with another embodiment of the invention. The desalination system comprises a desalination apparatus configured to remove hardness ions from an aqueous stream. The desalination apparatus comprises first and second electrodes, and a first group of paired ion exchange membranes disposed between the first and second electrodes to form a first group of alternating first and second channels to receive a first feed stream for removal of the hardness ions and a second feed stream to carry away the hardness ions removed from the first feed stream respectively. The desalination apparatus further comprises a second group of the paired ion exchange membranes disposed between the first group of the ion exchange membranes and at least one of the first and second electrodes to form a second group of the alternating first and second channels, and a plurality of spacers disposed between each pair of the adjacent ion exchange membranes and between the first and second electrodes and the respective ion exchange membranes. Wherein each of the ion exchange membranes in the first group of the paired ion exchange membranes is a cation exchange membrane, and wherein the second group of the paired ion exchange membranes comprises a plurality of alternating cation and anion exchange membranes.

Embodiment of the invention further provides a method for removing ions from an aqueous stream. The method comprises passing a first feed stream through first channels of a first group of alternating first and second channels defined by a first group of paired cation exchange membranes of a desalination apparatus for removing ions to produce a first output stream, and passing a second feed stream through the second channels of the first group of the alternating first and second channels defined by the first group of the paired cation exchange membranes of the desalination apparatus to carry away ions removed from the first feed stream.

These and other advantages and features will be better understood from the following detailed description of embodiments of the invention that is provided in connection with the accompanying drawings.

DETAILED DESCRIPTION OF THE INVENTION

Embodiments of the present disclosure will be described hereinbelow with reference to the accompanying drawings. In the following description, well-known functions or constructions are not described in detail to avoid obscuring the disclosure in unnecessary detail.

Figure 1:
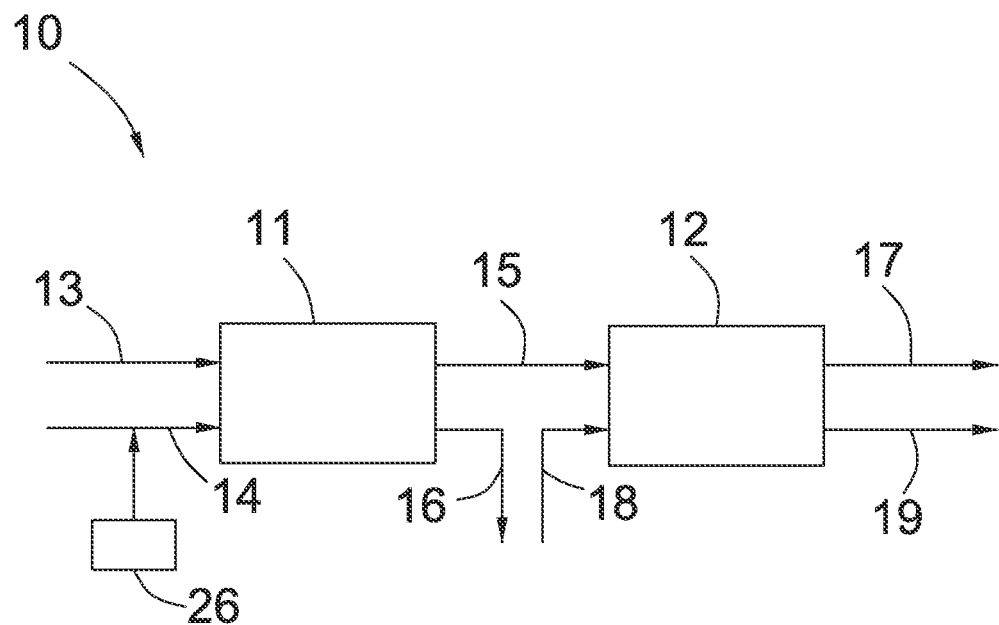
FIG. 1 is a schematic diagram of a desalination system in accordance with one embodiment of the invention.

FIG. 1 is a schematic diagram of a desalination system 10 in accordance with one embodiment of the invention. As illustrated in FIG. 1, the desalination system 10 comprises a desalination apparatus 11 and an electrodeionization (EDI) apparatus 12 in fluid communication with the desalination apparatus 11.

In some embodiments, the desalination apparatus 11 is configured to receive a first feed stream 13 having salts or other impurities from a first liquid source (not shown) for desalination and to receive a second feed stream 14 from a second liquid source (not shown) during or after desalination of the first feed stream 13 so as to carry charged species or target ions removed from the first feed stream 13 out of the desalination apparatus 11.

In non-limiting examples, the salts in the first feed stream 13 may include charged ions, such as sodium ($Na^+$), chlorine ($Cl^-$), hardness ions including magnesium ($Mg^{2+}$) and/or calcium ($Ca^{2+}$), and/or other ions. In one example, the charged ions in the first stream 13 at least include target ions, such as a portion of the hardness ions.

Thus, due to desalination of the desalination apparatus 11, at least a portion of the charged or target ions including the hardness ions in the first feed stream 13 may be removed. As a result, a first output stream 15 is produced and then may be introduced into the EDI apparatus 12 for further processing, which may be a dilute liquid and have a lower concentration of the charged species, such as the hardness ions as compared to the first feed stream 13. Meanwhile, a second output stream (a concentrated stream) 16 is also produced, which has a higher concentration of charged species, such as the hardness ions than the second feed stream 14.

In some applications, the first output stream 15 may be circulated into the desalination apparatus 11 or introduced into any other suitable desalination apparatuses, such as reversal osmosis apparatuses for further processing to remove the charged ions therein before introduced into the EDI apparatus 12. In certain applications, the EDI apparatus may or may not be employed based on different applications.

As used herein, the term "EDI" means an electrochemical purification process using ion exchange membranes and ion exchange resin to remove target ions or charged species from water or other fluids so as to produce higher quality water, for example, pure or ultrapure water.

In non-limiting examples, the EDI apparatus 12 comprises a pair of electrodes configured to act as an anode and a cathode, respectively. A plurality of alternating anion and cation exchange membranes are disposed between the anode and the cathode to form a plurality of alternating first and second channels therebetween, which are also referred to as dilute and concentrate channels under operating conditions. A plurality of spacers are disposed between each pair of the membranes, and between the electrodes and the respective adjacent membranes, which may be similar to the structure of an electrodialysis (ED) apparatus. Similarly, the anion exchange membrane(s) are configured to be passable for anions. The cation exchange membrane(s) are configured to be passable for cations.

In addition, based on different applications, the ion exchange resin may be filled into the first channels or the second channels for facilitation of transportation of ions, enhancing the conductivity between the adjacent ion exchange membranes, and electrochemical splitting of water. In non-limiting examples, the ion exchange resin may be filled into the first (dilute) channels.

For some arrangements, the electrodes of the EDI apparatus 12 may be in the form of plates that are disposed parallel to each other to form a stacked structure. Alternatively, the electrodes may be arranged in varying configurations. For example, the electrodes may be disposed concentrically with a spiral and continuous space therebetween. In some applications, the electrodes may include electrically conductive materials. The spacers may comprise any ion-permeable, electronically nonconductive material, including membranes and porous and nonporous materials.

In non-limiting examples, the cathode may include stainless steel. The anode may include iridium oxide or platinum coated titanium. The anion exchange membrane may comprise a polymeric material that includes quaternary amine groups. The cation exchange membrane may comprise a polymeric material that includes sulfonic acid groups and/or carboxylic acid groups. The ion exchange resin may include crosslinked polystyrene or other suitable materials.

Accordingly, during operation, an electrical current is applied to the EDI apparatus 12. The first output stream 15 from the desalination apparatus 11 is introduced into the dilute channels filled with the ion exchange resin for further removal of the target ions, such as the hardness ions therein so as to produce a product fluid 17 with a higher quality. A third stream 18 from a liquid source (not shown) is introduced into the concentrate channels to carry the removed target ions from the respective dilute channels out of the EDI apparatus 12 so as to produce a concentrate fluid 19. In certain applications, the product fluid 17 may be circulated into the EDI apparatus 12 for further processing.

Meanwhile, water splitting reactions occur in the ion exchange resin in the first channels to produce $H^+$ and $OH^-$ for regeneration of the ion exchange resin for facilitation of continuous operation. An electrolyte stream (not shown) may pass through surfaces of the electrodes to remove gases, such as hydrogen and chlorine generated during the operation to protect the electrodes.

Generally, the EDI apparatus 12 has a hardness tolerance for a liquid to be processed therein. For example, the hardness tolerance of the EDI apparatuses may be about less than 1 ppm. In order to decrease the hardness in the liquid to a suitable level so as to alleviate or avoid scaling or fouling tendency in the EDI apparatus 12 during processing, as depicted in FIG. 1, the desalination apparatus 11 is employed to pretreat the first feed stream 13 so as to produce the first output stream 15 having a suitable level of the target ions including, but not limited to the hardness ions.

Figure 2:
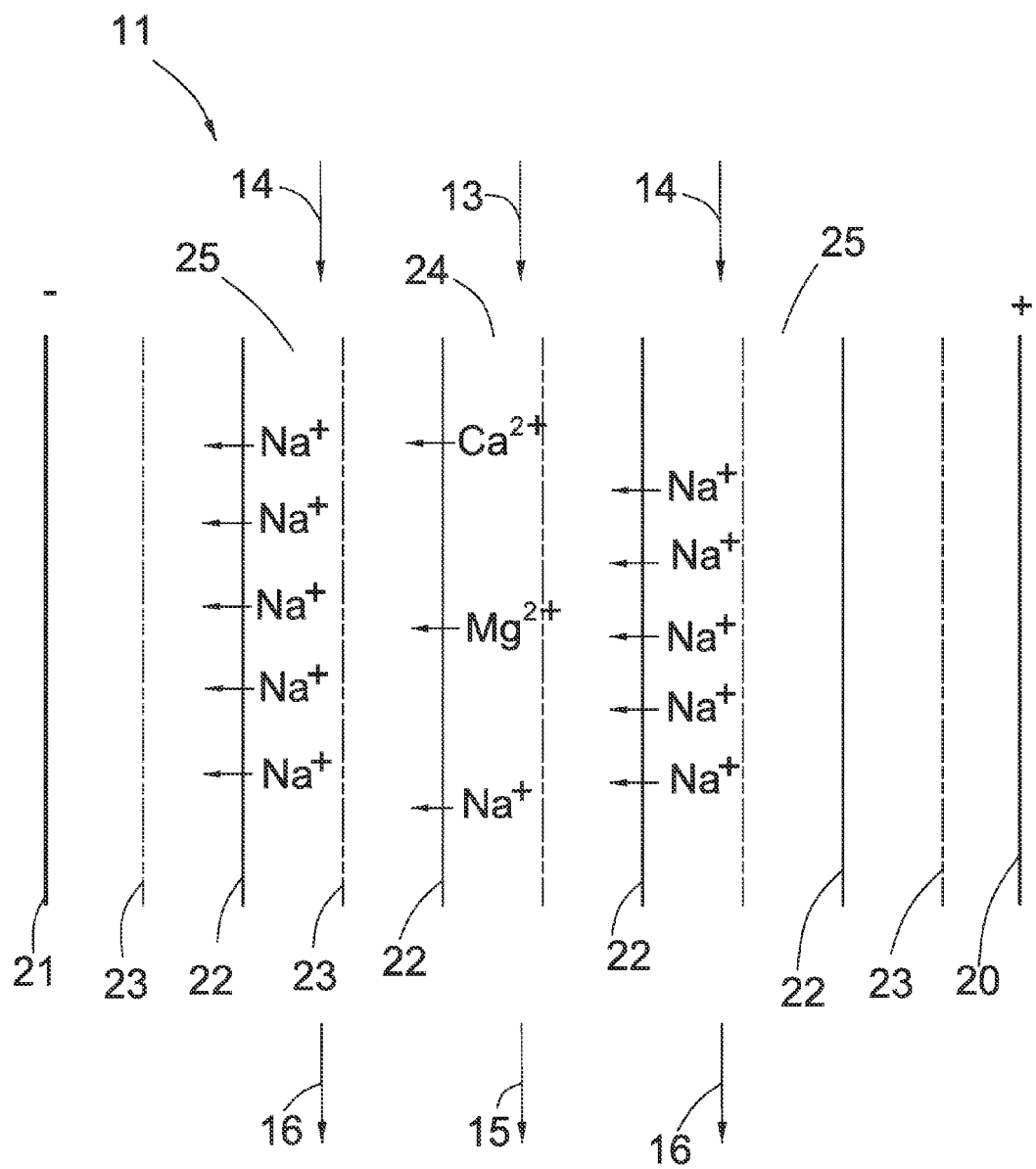
FIG. 2 is schematic diagram of a desalination apparatus in accordance with one embodiment of the invention.

FIG. 2 illustrates a schematic diagram of the desalination apparatus 11 in accordance with one embodiment of the invention. As illustrated in FIG. 2, the desalination apparatus 11 comprises a first electrode 20, a second electrode 21, a plurality of cation exchange membranes 22 and a plurality of spacers 23. In the illustrated example, the first and second electrodes 20, 21 are connected to positive and negative terminals of a power source (not shown) so as to act as an anode and a cathode, respectively. Alternatively, the polarity of the first and second electrodes 20, 21 may be reversed.

In some examples, the first and second electrodes 20, 21 may include metal materials with different shapes, such as titanium plates or platinum coated titanium plates. In other examples, the first and second electrodes 20, 21 may include electrically conductive materials, which may or may not be thermally conductive, and may have particles with smaller sizes and large surface areas. In some examples, the electrically conductive material may include one or more carbon materials. Non-limiting examples of the carbon materials include activated carbon particles, porous carbon particles, carbon fibers, carbon aerogels, porous mesocarbon microbeads, or combinations thereof. In other examples, the electrically conductive materials may include a conductive composite, such as oxides of manganese, or iron, or both, or carbides of titanium, zirconium, vanadium, tungsten, or combinations thereof.

In the illustrated example, the first and second electrodes 20, 21 are in the form of plates that are disposed parallel to each other to form a stacked structure. In other examples, the first and second electrodes 20, 21 may have varied shapes, such as a sheet, a block, or a cylinder. In addition, the first and second electrodes 20, 21 may be arranged in varying configurations. For example, the first and second electrodes 20, 21 may be disposed concentrically with a spiral and continuous space therebetween.

The cation exchange membranes 22 are configured to be passable for cations and are disposed between the first and second electrodes 20, 21 so as to form a plurality of alternating first and second channels 24, 25 therebetween, which are also referred to as dilute and concentrate channels under operating conditions, respectively. In the illustrated example, four cation exchange membranes 22 are employed to form one first channel 24 and two second channels 25, which are disposed alternatingly. Alternatively, at least three cation exchange membranes 22 may be employed so as to form one or more first channels and one or more second channels between the first and second electrodes 20, 21.

In some applications, the cation exchange membranes 22 may comprise normal cation exchange membranes configured to be passable for not only the monovalent anions but also polyvalent anions. In certain applications, based on different applications, for example, for removal of monovalent cations, the desalination apparatus 11 may comprise one or more monovalent cation exchange membranes. Thus, the normal cation exchange membranes and the monovalent cation exchange membranes may be disposed alternately to facilitate removal of the hardness ions. Non-limiting examples of suitable materials for use in the normal cation exchange membranes include a polymeric material that includes sulfonic acid groups and/or carboxylic acid groups, for transmission of the cations.

The spacers 23 are disposed between each pair of two adjacent ion exchange membranes 22, and between the first and second electrodes 20, 21 and the respective adjacent membranes 22. In some embodiments, the spacers 23 may comprise any ion-permeable, electronically nonconductive material, including membranes and porous and nonporous materials.

Accordingly, during operation, when the desalination apparatus 11 is at a normal polarity state, while an electrical current is applied to the desalination apparatus 11, liquids, such as the first and second streams 13, 14 are introduced into the first channel 24 and the second channels 25, respectively. In certain applications, the first and second stream 13, 14 may or may not be introduced into desalination apparatus 11 simultaneously.

During the first and second stream 13, 14 pass through the respective dilute and concentrate channels 24, 25, due to presence of the cation exchange membranes 22, in the dilute channel 24, at least a portion of the target ions, such as $Mg^{2+}$ and $Ca^{2+}$, and other cations, such as $Na^+$ in the first feed stream 13 may migrate through the respective cation exchange membranes 22 towards the anode 20 to enter into the concentrate channels 25. Anions, such as $Cl^-$ in the first feed stream 13 may not migrate through the respective anion exchange membrane and remain in the dilute channel 24.

In the concentrate channels 25, anions, such as $Cl^-$ in the second feed stream 14 may not migrate through the anion exchange membrane 22 and remain therein. In certain applications, a portion of the removed target cations, such as $Mg^{2+}$ and/or $Ca^{2+}$ migrated into the concentrate channels 25 from the first feed stream 13 in the dilute channel 24 and other cations, such as Na+ may further migrate through the cation exchange membranes 22 to enter into the dilute channel(s) 24 from the respective adjacent concentrate channels 25 during operation.

In non-limiting examples, in order to prevent at least a portion of the removed target ions migrated into the concentrate channels 25 from the dilute channels 24 from entering into the dilute channels 24 so as to enter into the first feed stream 13 again, the second feed stream 14 may include active monovalent cations, such as $Na^+$ (which is referred to be as $Na^+$-rich stream), which may carry at least a larger portion of the ionic current than the target ions migrated into the concentrate channels 25 from the dilute channel 24 when the cations migrate from the concentrate channels 25 to the respective dilute channels 24 during operation.

In non-limiting examples, a concentration of the active monovalent cations may be greater than a concentration of the removed target ions in the respective concentrate channels 25. In some examples, an ionic mobility of the active monovalent ions may be greater than the ionic mobility of the removed target ions in the respective concentrate channels 25 when migrated from the concentrate channels 25 to the respective dilute channels 24. In other examples, amounts of the active monovalent cations in the second feed stream 14 may be greater than amounts of the removed target ions in the concentrate channels 25 when migrated from the concentrate channels 25 to the respective dilute channels 24.

As a result, at least a larger portion of the active monovalent cations in the second feed stream 14 in the concentrate channels 25 may migrate through the cation exchange membrane 22 to enter into the adjacent dilute channel 24. Accordingly, during operation, since the active monovalent cations in the second feed stream 14 may carry at least a larger portion of the ionic current than the removed target ions in the concentrate channels 25 when continuing to migrate from the concentrate channels 25 to the respective dilute channels 24 during operation, at least a larger portion of the removed target ions migrated into the concentrate channels 25 from the dilute channels 24 may not migrate through the cation exchange membranes 22 to further enter into the dilute channels 24 to remain in the respective concentrate channels 25 so as to increase the efficiency of the target ions removed from the first feed stream 13.

For some arrangements, in order to increase the ionic current carried by the active monovalent cations in the second feed stream 14 when migrated into the dilute channels 24 from the concentrate channel 25, as illustrated in FIG. 1, the desalination system 10 further comprises an ion adjustment unit 26 in fluid communication with the second feed stream 14 so as to facilitate that the ionic current carried by the active monovalent anions in the second feed stream 14 are greater than the ionic current carried by the target ions in the concentrate channels 25 when migrated from the concentrate channels 25 to the respective dilute channels 24. In non-limiting examples, the active monovalent cations may include $Na^+$, $K^+$ or $H^+$. In one example, the ion adjustment unit 26 introduces sodium chloride solution into the second feed stream 14 to increase the concentration of the active monovalent ions, such as sodium ions ($Na^+$). In certain applications, the ion adjustment unit 26 may or may not be employed.

Accordingly, as depicted in FIG. 2, during operation, the second feed stream 14 passes through the concentrate channels 25 to carry at least a portion of the removed target anions, such as the hardness ions migrated from the dilute channels 24 out of the desalination apparatus 11, so that the first output stream 15 having a suitable level of the hardness ions is then introduced into the EDI apparatus 12 for further processing.

In some examples, the polarity of the first and second electrodes 20, 21 of the desalination apparatus 11 may be reversed. In the reversed polarity state, the dilute channels 24 from the normal polarity state may act as the concentrate channels to receive the second feed stream 14, and the concentrate channels 25 from the normal polarity state may function as the dilute channels to receive the first feed stream 13 for desalination, for example, for removal of the hardness ions in the first feed stream 13 and alleviation of the fouling tendency of the anions and cations in the desalination apparatus 11.

It should be noted that the arrangements in FIG. 2 is merely illustrative. In some applications, the desalination apparatus 11 may be employed to remove different target ions using different active cations. In the illustrated example, the target ions to be removed at least include the hardness ions, and the active ions in the second feed stream 14 include $Na^+$. In other examples, the active ions may include, but not limited to $K^+$ and $H^+$.

Figure 3:
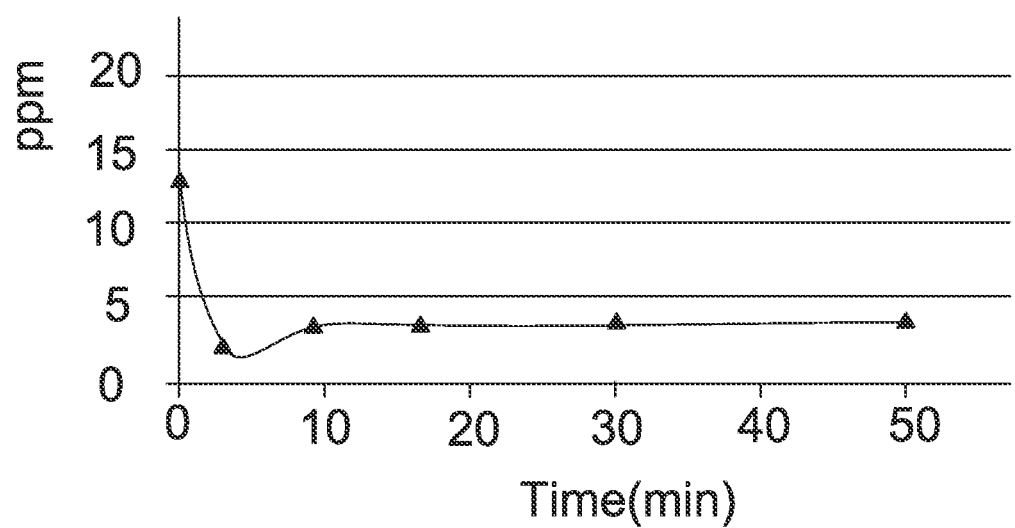
FIG. 3 is an experimental graph illustrating hardness ion removal efficiency of the desalination apparatus in accordance with one embodiment of the invention.

FIG. 3 is an experimental graph illustrating hardness ion removal efficiency of the desalination apparatus 11 in accordance with one embodiment of the invention. In this experimental example, the desalination apparatus 11 comprises nine cation exchange membranes 22. The DC voltage on the desalination apparatus 11 is about 5 volts. As illustrated in FIG. 3, during continuous processing for about 50 minutes in the desalination apparatus 11, the first feed stream 13 having a hardness of about 13 ppm is processed to produce the first output stream (product stream) 15 having a hardness of about 3 ppm.

Thus, about 77% of the hardness ions may be removed from the first feed stream and the hardness of the product stream 15 remains around 3 ppm during operation, which may indicate the desalination apparatus 11 has a relatively higher and stable remove efficiency of the hardness ions.

Figure 4:
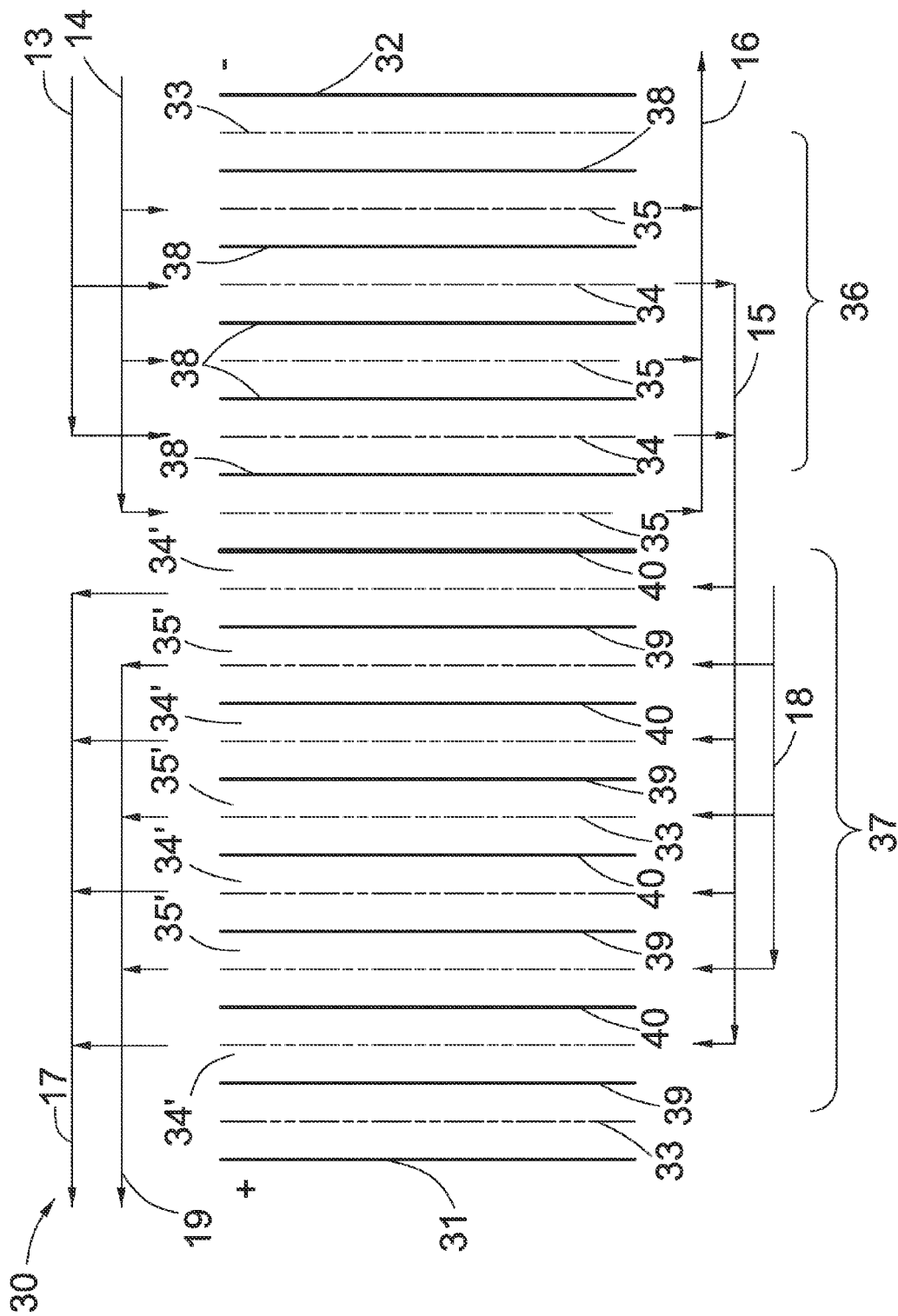
FIG. 4 is a schematic diagram of the desalination system in accordance with another embodiment of the invention.

In the illustrated example in FIG. 1, the desalination apparatus 11 and the EDI apparatus 12 are disposed separately. In other examples, as illustrated in FIG. 4, the desalination apparatus 11 and the EDI apparatus 12 of the desalination system 10 may be disposed unitarily by using a common cathode and a common anode to act as a desalination apparatus 30. The same numerals in FIGS. 1-2 and 4 may indicate similar elements. For easy illustration, some elements, for example the ion exchange resin are not illustrated in the arrangement in FIG. 4.

As depicted in FIG. 4, the desalination apparatus 30 comprises a first electrode 31, a second electrode 32, a plurality of ion exchange membranes 38, 39, 40, and a plurality of spacers 33. In the illustrated example, the first and second electrodes 31, 32 are connected to positive and negative terminals of a power source (not shown) so as to act as an anode and a cathode, respectively.

In some applications, the first and second electrodes 31, 32 may include electrically conductive materials. In non-limiting examples, the cathode may include stainless steel. The anode may include iridium oxide or platinum coated titanium. For some arrangements, the first and second electrodes 31, 32 may be in the form of plates that are disposed parallel to each other to form a stacked structure. Alternatively, the electrodes may be arranged in varying configurations. For example, the first and second electrodes 31, 32 may be disposed concentrically with a spiral and continuous space therebetween.

In the illustrated example, the ion exchange membranes are divided into first and second groups 36, 37 disposed between the first and second electrodes 31, 32 to form first groups of alternating first and second channels 34-35, and second groups of alternating first and second channels 34'-35' therebetween, which are also referred to as first and second groups of dilute and concentrate channels under operating conditions, respectively. In non-limiting examples, each of the first and second groups of the alternating first and second channels may comprises a plurality of the alternating first and second channels.

The second group 37 is disposed between the first group 36 and the first electrode 31 so that the first channels 34' of the second group of the first and second channels 34'-35' are configured to receive a liquid from the first channel 34 of the first group of the first and second channels 34-35 in the first group 36 from further processing. One concentrate channel 35 is formed between the first and second groups 36, 37. Alternatively, the second group 37 may be disposed between the first group 36 and the second electrode 32. Each of the ion exchange membranes of the first group 36 comprises a cation ion exchange membrane 38. The second group 37 comprises a plurality of alternating cation and anion exchange membranes 39, 40 so as to form the second group of the alternating dilute and concentrate channels 34', 35'.

In some examples, each of the cation ion exchange membranes 38 of the first group 36 may comprise similar materials to the materials of the cation exchange membrane 22 in FIG. 2. Non-liming examples of the cation and anion exchange membranes 39, 40 of the second group 37 include similar materials to the respective cation and anion exchange membranes in the electrodeionization (EDI) apparatus 12.

In certain applications, during operation, in order to protect the ion exchange membrane of the second group 37, for example, the anion exchange membrane 40, which is disposed adjacent to the first group 36 to endure a higher pressure difference, the thickness of the anion exchange membrane 40 adjacent to the first group 36 may be thicker than the thickness of other ion exchange membranes, which are not adjacent to the respective electrodes 31, 32, in the first and second groups 36, 37. In non-limiting examples, the thickness of the anion exchange membrane 40 adjacent to the first group 36 may be in a range of from 1 mm to 3 mm, for example, 2 mm. In other examples, the membranes adjacent to the respective first and second electrodes 31, 32 may also have a higher thickness, for example in a range of from 1 mm to 3 mm, such as 2 mm.

The spacers 33 are disposed between each pair of the adjacent ion exchange membranes, and between the first and second electrodes 31, 32 and the respective adjacent membranes 38, 39. In some embodiments, the spacers 33 may also comprise any ion-permeable, electronically nonconductive material, including membranes and porous and nonporous materials.

Accordingly, similar to the arrangements in FIG. 2, during operation, while an electrical current is applied to the desalination apparatus 30, liquids, such as first feed stream 13 is introduced into the first (dilute) channel 34. The second feed stream 14 is introduced into the second (concentrated) channels 35 in the first group 36 and between the first and second groups 36, 37 respectively. As a result, at least a portion of target ions including, but not limited to hardness ions may be removed from the first feed stream 13 to produce a first output stream (a dilute stream) 15. The second feed stream 14 carries at least a portion of the target ions removed from the first feed stream 13 out of the desalination device 30 during or after desalination of the first feed stream 13 to produce a second output stream (a concentrate stream) 16.

Subsequently, similar to the EDI apparatus 12 shown in FIG. 1, the first output stream 15 from the first group 36 is introduced into the dilute channels 34' filled with the ion exchange resin (not shown) of the second group 37 for further removal of the target ions, such as the hardness ions so as to produce a product fluid 17 with a higher quality. Meanwhile, water splitting reactions occur in the ion exchange resin in the dilute channels 34' for regeneration of the ion exchange resin. A third stream 18 from a liquid source (not shown) is introduced into the concentrated channels 35' of the second group 37 to carry the removed ions from the respective dilute channels 34' out of the desalination device 30 so as to produce a concentrate fluid 19.

It should be noted that the arrangement in FIG. 4 is merely illustrative. In the illustrated example, the EDI apparatus 12 is integrated with the desalination apparatus 11 shown in FIG. 1. Alternatively, other desalination apparatuses, such as electrodialysis (ED) apparatuses or electrodialysis reversal (EDR) apparatuses may also be disposed unitarily with the desalination apparatus 11 by using a common cathode and a common anode. Similarly, other target ions, including, but not limited to the hardness ions may also be removed. In some examples, the polarity of the first and second electrodes 31, 32 may be reversed.

In embodiments of the invention, the desalination apparatus 11 employs the cation ion exchange membranes to process a liquid for removal of the target ions, such as the hardness ions therein, which has stable and relatively higher removal efficiency. As a result, when the liquid having a suitable concentration level of the target ions is introduced into the EDI apparatus for further processing, the scaling or fouling issues may be avoided or alleviated so that the EDI apparatus sustains a continuous and stable operation. In addition, the desalination apparatus 11 may be disposed separately from or unitary with the EDI apparatus or other desalination apparatuses, which improves the system flexibility for processing of a liquid.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A desalination system, comprising:
   a desalination apparatus, comprising:
      first and second electrodes;
      a first group of paired ion exchange membranes disposed between the first and second electrodes to form a first group of alternating first and second channels, the first channels configured to receive a first feed stream for desalination and the second channels configured to receive a second feed stream to carry away ions removed from the first feed stream, respectively; and
      a plurality of spacers disposed between each pair of the adjacent ion exchange membranes and between the first and second electrodes and the respective ion exchange membranes,
      wherein each of the ion exchange membranes in the first group is a cation exchange membrane; and
   an electrodeionization apparatus configured to receive a stream from the first channels of the first group of the alternating first and second channels of the desalination apparatus for further processing.

2. The desalination system of claim 1, wherein the cation exchange membranes in the first group of the paired ion exchange membranes comprise alternating normal cation exchange membranes and monovalent cation exchange membranes.

3. The desalination system of claim 1, further comprising an ion adjustment unit in fluid communication with the desalination apparatus and configured to increase amounts of active ions in the second feed stream.

4. The desalination system of claim 3, wherein the ion adjustment unit is configured to introduce sodium chloride solution into the second feed stream to increase the amounts of the active ions.

5. The desalination system of claim 1, wherein the desalination apparatus is configured to remove at least a portion of hardness ions in the first feed stream.

6. The desalination system of claim 1, wherein the desalination apparatus further comprises a second group of the paired ion exchange membranes disposed between the first group of the ion exchange membranes and at least one of the first and second electrodes to form a second group of the alternating first and second channels, and wherein the second group of the ion exchange membranes comprises a plurality of alternating cation and anion exchange membranes.

7. The desalination system of claim 6, wherein the desalination apparatus further comprises ion exchange resin filled into the first channels of the second group of the alternating first and second channels.

8. The desalination system of claim 6, wherein the first channels of the second group of the alternating first and second channels are configured to receive a liquid from the first channels of the first group of the alternating first and second channels.

9. A desalination system, comprising:
   a desalination apparatus configured to remove hardness ions from an aqueous stream, comprising:
      first and second electrodes;
      a first group of paired ion exchange membranes disposed between the first and second electrodes to form a first group of alternating first and second channels to receive a first feed stream for removal of the hardness ions and a second feed stream to carry away the hardness ions removed from the first feed stream, respectively;
      a second group of the paired ion exchange membranes disposed between the first group of the ion exchange membranes and at least one of the first and second electrodes to form a second group of the alternating first and second channels; and
      a plurality of spacers disposed between each pair of the adjacent ion exchange membranes and between the first and second electrodes and the respective ion exchange membranes,
      wherein each of the ion exchange membranes in the first group of the paired ion exchange membranes is a cation exchange membrane, and wherein the second group of the paired ion exchange membranes comprises a plurality of alternating cation and anion exchange membranes.

10. The desalination system of claim 9, wherein the first channels of the second group of the alternating first and second channels are configured to receive a liquid from the first channels of the first group of the alternating first and second channels.

11. The desalination system of claim 9, further comprising an ion adjustment unit in fluid communication with the desalination apparatus and configured to increase amounts of active ions in the second feed stream, and wherein the ion adjustment unit is configured to introduce sodium chloride solution into the second feed stream to increase the amounts of the active ions.

12. The desalination system of claim 9, wherein a thickness of the ion exchange membrane of the second group of the paired ion exchange membranes adjacent to the first group of the ion exchange membranes is greater than a thickness of each of other ion exchange membranes nonadjacent to the first and second electrodes in the second group.

13. A method for removing ions from an aqueous stream, comprising:
    passing a first feed stream through first channels of a first group of alternating first and second channels defined by a first group of paired cation exchange membranes of a desalination apparatus for removing at least a portion of cations to produce a first output stream;
    passing a second feed stream through the second channels of the first group of the alternating first and second channels defined by the first group of the paired cation exchange membranes of the desalination apparatus to carry away the at least the portion of the cations removed from the first feed stream; and
    passing the first output stream through an electrodeionization apparatus for further processing.

14. The method of claim 13, wherein the desalination apparatus comprises:
    first and second electrodes;
    the first group of the paired cation exchange membranes disposed between the first and second electrodes to form the first group of the alternating first and second channels; and
    a plurality of spacers disposed between each pair of adjacent ion exchange membranes and between the first and second electrodes and the respective ion exchange membranes.

15. The method of claim 14, wherein the desalination apparatus further comprises a second group of paired ion exchange membranes disposed between the first group of the cation exchange membranes and at least one of the first and second electrodes to form a second group of the alternating first and second channels, and wherein the second group of the ion exchange membranes comprises a plurality of alternating cation and anion exchange membranes.

16. The method of claim 13, further comprising increasing amounts of active cations in the second feed stream before the second feed stream is introduced into the desalination apparatus.

17. The method of claim 15, wherein the desalination apparatus further comprises ion exchange resin filled into the first channels of the second group of the alternating first and second channels.

18. The method of claim 13, further comprising:
    passing the first output stream through first channels of a second group of the alternating first and second channels defined by a second group of paired ion exchange membranes of the desalination apparatus for ion removal; and
    passing a third stream through the second channels of the second group of the alternating first and second channels defined by the second group of the paired ion exchange membranes of the desalination apparatus to carry away ions removed from the first output stream.

19. The method of claim 13, further comprising
    passing a third stream through the electrodeionization apparatus to carry away ions removed from the first output stream.

* * * * *